US009038084B2

United States Patent
Accapadi et al.

(10) Patent No.: US 9,038,084 B2
(45) Date of Patent: May 19, 2015

(54) MANAGING UTILIZATION OF PHYSICAL PROCESSORS OF A SHARED PROCESSOR POOL IN A VIRTUALIZED PROCESSOR ENVIRONMENT

(75) Inventors: Mathew Accapadi, Austin, TX (US); Grover C. Davidson, II, Round Rock, TX (US); Dirk Michel, Austin, TX (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 500 days.

(21) Appl. No.: 13/403,548

(22) Filed: Feb. 23, 2012

(65) Prior Publication Data

US 2013/0227549 A1    Aug. 29, 2013

(51) Int. Cl.
| | |
|---|---|
| G06F 9/46 | (2006.01) |
| G06F 9/455 | (2006.01) |
| G06F 15/173 | (2006.01) |
| G06F 9/50 | (2006.01) |

(52) U.S. Cl.
CPC .......... *G06F 9/5077* (2013.01); *G06F 9/45558* (2013.01)

(58) Field of Classification Search
CPC .............. G06F 9/45533; G06F 9/5077; G06F 2201/815; G06F 9/455; G06F 9/45558; G06F 9/50; G06F 2009/45566; G06F 2009/45575
USPC .......................................................... 718/1
See application file for complete search history.

(56) References Cited

U.S. PATENT DOCUMENTS

| | | | |
|---|---|---|---|
| 7,194,616 B2 | 3/2007 | Axnix et al. | |
| 7,725,559 B2 | 5/2010 | Landis et al. | |
| 7,752,620 B2 | 7/2010 | Accapadi et al. | |
| 7,984,108 B2 | 7/2011 | Landis et al. | |
| 2011/0197004 A1 | 8/2011 | Serebrin et al. | |
| 2012/0278800 A1* | 11/2012 | Nicholas et al. | 718/1 |

OTHER PUBLICATIONS

Anonymous, System and Method for a Dynamic Virtual Network Partition Infrastructure, Apr. 27, 2010, 8 pages, ip.com/pubview/IPCOM000195263D.
IBM, Method of Reducing Inter-VM Communication Costs, Oct. 22, 2008, 5 pages, ip.com/pubview/IPCOM000175736D.

* cited by examiner

*Primary Examiner* — Mengyao Zhe
*Assistant Examiner* — Bing Zhao
(74) *Attorney, Agent, or Firm* — Kunzler Law Group

(57) ABSTRACT

Systems, methods and computer program products may provide managing utilization of one or more physical processors in a shared processor pool. A method of managing utilization of one or more physical processors in a shared processor pool may include determining a current amount of utilization of the one or more physical processors and generating an instruction message. The instruction message may be at least partially determined by the current amount of utilization. The method may further include sending the instruction message to a guest operating system, the guest operating system having a number of enabled virtual processors.

20 Claims, 6 Drawing Sheets

MANAGING UTILIZATION OF PHYSICAL PROCESSORS OF A SHARED PROCESSOR POOL IN A VIRTUALIZED PROCESSOR ENVIRONMENT

BACKGROUND

The present invention relates to managing utilization of one or more physical processors in a shared processor pool, and more specifically, to managing utilization of one or more physical processors at least partially determined by a current amount of utilization of the one or more physical processors.

LPARs in a virtualized environment may be configured in uncapped mode and may use more virtual processors than entitlement. This assures that the LPAR itself is not limited by its entitled number of virtual processors in the case that the demand on physical processor or central processing unit (CPU) usage becomes higher than anticipated. A limiting factor is the availability of physical processors in a shared pool of CPUs or processors.

A disadvantage of such a configuration is that it typically results in a situation where the number of virtual processors configured on a system exceeds the number of physical processors in the shared processor pool. Virtual processor management in an operating system, such as AIX, may prevent all configured virtual processors of the LPARs from being active when the demand on CPU cycles is low, also known as processor folding. However, an increase in CPU demand can lead to a situation where enough virtual processors become enabled that the shared processor pools become depleted, even though the individual LPARs are not consuming all the CPU capacity assigned to them.

BRIEF SUMMARY

According to one embodiment of the present invention, a method of managing utilization of one or more physical processors in a shared processor pool is provided. The method may include determining a current amount of utilization of the one or more physical processors and generating an instruction message. The instruction message may be at least partially determined by the current amount of utilization. The method may further include sending the instruction message to a guest operating system, the guest operating system having a number of enabled virtual processors.

In some embodiments of the method, the instruction message may include an indication to the guest operating system to change the number of enabled virtual processors. Additionally and/or alternatively, the instruction message may include an indication to the guest operating system to maintain the number of enabled virtual processors. Additionally and/or alternatively, the current amount of utilization may include the ratio of the amount of the one or more physical processors currently in use to the amount of the one or more physical processors potentially available for use.

Further, in some embodiments, the method may also include generating an additional message and sending the additional message to the guest operating system. The additional message may be generated after a random interval of time and may include one of spurious data and no data. The method may additionally and/or alternatively include receiving the instruction message and/or changing the number of enabled virtual processors at the guest operating system in response to the instruction message. The method may further include receiving an additional message and/or repeating the change to the number of enabled virtual processors at the guest operating system.

Additionally and/or alternatively, some embodiments of the method may include determining the number of enabled virtual processors of the guest operating system exceeds an entitled number of enabled virtual processors and/or determining the current amount of utilization is below a preset minimum amount, wherein the instruction message may include an indication to reduce the number of enabled virtual processors. Additionally and/or alternatively, some embodiments of the method may include receiving a request from the guest operating system to enable an additional virtual processor and/or determining the current amount of utilization is below a preset maximum amount, wherein the instruction message includes an indication to maintain the number of enabled virtual processors.

In an alternative embodiment of the invention, a computer program product for managing utilization of one or more physical processors in a shared processor pool is provided. The computer program product may include at least one computer readable storage medium having computer readable program code embodied therewith. The computer readable program code, when read by a processor, may be configured to determine a current amount of utilization of the one or more physical processors, generate an instruction message, and send the instruction message to a guest operating system. The guest operating system may have a number of enabled virtual processors. The instruction message may be at least partially determined by the current amount of utilization, In some embodiments of the computer program product, the instruction message may include an indication to change the number of enabled virtual processors. Additionally and/or alternatively, the computer readable program code, when read by a processor, may be further configured to generate an additional message, the additional message generated after a random interval and not determined by the current amount of utilization of the one or more physical processors, and send the additional message to the guest operating system. Additionally and/or alternatively, the computer readable program code, when read by a processor, may be further configured to determine that the guest operating system has not changed the number of enabled virtual processors in response to the instruction message and reduce an entitled number of enabled virtual processors allocated to the guest operating system.

According to a further embodiment of the invention, a computer is provided. The computer may include a processor, a memory and a program for managing utilization of one or more physical processors in a shared processor pool. The program may include a plurality of instructions stored in the memory that may be executed by the processor to determine a current amount of utilization of the one or more physical processors, generate an instruction message and send the instruction message to a guest operating system. The guest operating system may have a number of enabled virtual processors. The instruction message may be at least partially determined by the current amount of utilization. In some embodiments of the computer, the instruction message may include an indication to change the number of enabled virtual processors.

DETAILED DESCRIPTION

Figure 1:
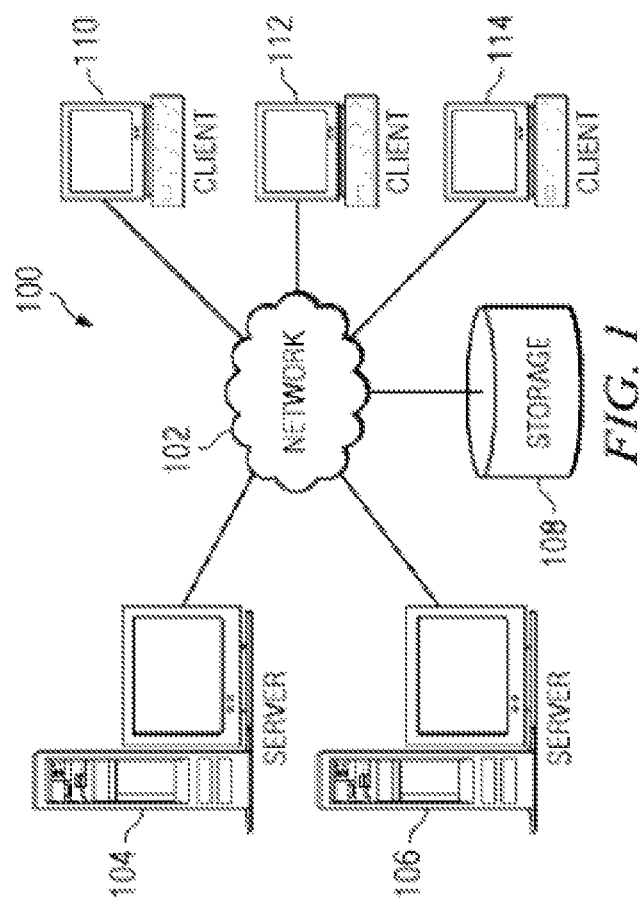
FIG. 1 is a pictorial representation of an example of a computer system in which illustrative embodiments may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF cable, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or server, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
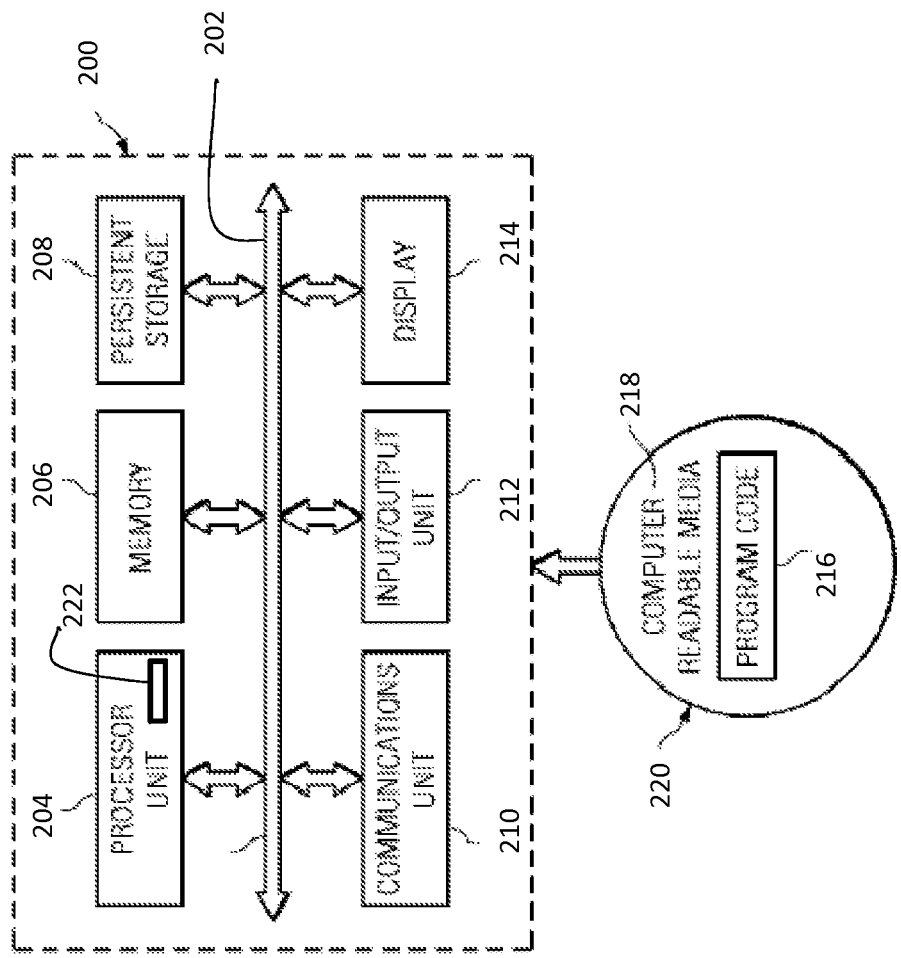
FIG. 2 is a block diagram of an example of a computer in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a computer system, indicated generally at 100, and including a network of computers in which illustrative embodiments may be implemented. Computer system 100 may contain a network 102, which is the medium used to provide communications links between various devices and computers connected together within computer system 100. Network 102 may include connections, such as wire, wireless communication links, or fiber optic cables.

In the depicted example, a server 104 and a server 106 may connect to network 102 along with a storage unit 108. In addition, a first client computer 110, a second client computer 112, and a third client computer 114 may connect to network 102. Client computers 110, 112, and 114 may be, for example, personal computers or network computers and/or may also be referred to as nodes. In the depicted example, server 104 may provide data, such as boot files, operating system images, and/or software applications to client computers 110, 112, and 114. Computer system 100 may include additional servers, clients, and other devices not shown, or may include fewer devices than those shown.

In the depicted example, network 102 may include the Internet. Computer system 100 also may be implemented with a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system 200 is shown in which illustrative embodiments may be implemented. Data processing system 200 is an example of a computer, such as server 104 or client computer 110 in FIG. 1, in which computer-usable program code or instructions implementing the processes may be located for the illustrative embodiments. In this illustrative example, data processing system 200 may include a communications fabric 202 that may provide communications between two or more of a processor unit 204, a memory or memory subsystem 206, a persistent storage 208, a communications unit 210, an input/output (I/O) unit 212, and display 214. In other examples, a data processing system may include more or fewer devices.

Processor unit 204 may serve to execute instructions for software that may be loaded into memory 206. Processor unit 204 may include a set of one or more processors, a core 222, or may be a multi-processor core, depending on the particular implementation. Further, processor unit 204 may be implemented using one or more heterogeneous processor systems in which a main processor is present with secondary processors on a single chip. As another illustrative example, processor unit 204 may include a symmetric multi-processor system containing multiple processors of the same type.

Memory 206 and persistent storage 208 are examples of storage devices. A storage device may include any piece of hardware that is capable of storing information either on a temporary basis and/or a permanent basis. Memory 206, in these examples, may include, for example, a random access memory or any other suitable volatile or non-volatile storage device. Persistent storage 208 may take various forms depending on the particular implementation. For example, persistent storage 208 may include one or more components or devices. For example, persistent storage 208 may include a hard drive, a flash memory, a rewritable optical disk, a rewritable magnetic tape, or some combination of the above. The media used by persistent storage 208 also may be removable. For example, a removable hard drive may be included in persistent storage 208.

Communications unit 210, in these examples, may provide communications with other data processing systems or devices. For example, communications unit 210 may include a network interface card. Communications unit 210 may provide communications through the use of either or both physical and wireless communications links.

Input/output unit 212 may allow for input and output of data with other devices that may be connected to data processing system 200. For example, input/output unit 212 may provide a connection for user input through a keyboard and mouse. Further, input/output unit 212 may send output to a printer. Display 214 may display information to a user.

Instructions for the operating system and applications or programs may be located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 may be located in a functional form on a computer-readable media 218 that is selectively removable and may be loaded onto or transferred to data processing system 200 for execution by processor unit 204. One or both of program code 216 and computer-readable media 218 may be included in a computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in tangible forms.

In some examples, communications fabric 202 may include a bus system and may be comprised of one or more buses, such as a system bus or an input/output bus. Of course, the bus system may be implemented using any suitable type of architecture that provides for a transfer of data between different components or devices attached to the bus system. Additionally, communications unit 210 may include one or more devices used to transmit and receive data, such as a modem or a network adapter. Further, memory 206 may include one or more of a memory, a buffer and/or one or more cache level(s) such as found in an interface and a memory controller hub that may be present in communications fabric 202.

Figure 3B:
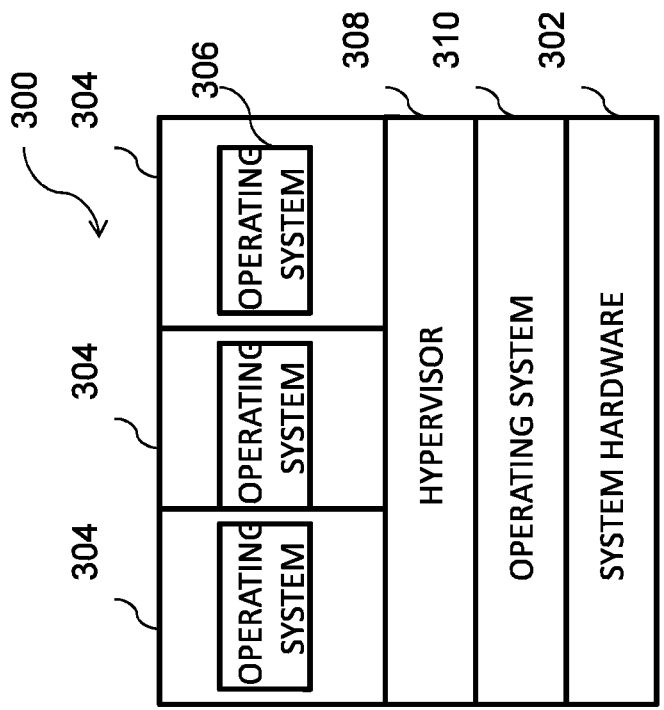
FIGS. 3A and 3B are block diagrams of an example of a computer system in which illustrative embodiments may be implemented.
Figure 3A:
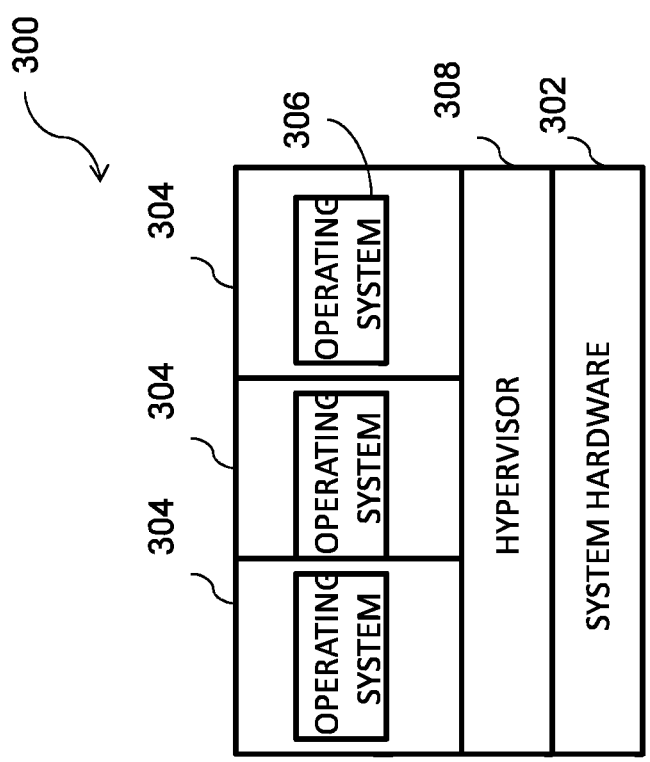

Turning now to FIGS. 3A and 3B, a physical computer 300 having hardware 302, including for example physical processors (also referred to herein as CPUs and/or a shared processor pool) may be partitioned into multiple partitions or LPARs 304. Each partition 304 may host a separate operating system 306, also referred to herein as a guest operating system 306, and may include a subset of a computer's hardware 302 resources, virtualized as a separate computer. In some embodiments, partition 304 may be configured in uncapped mode and may, accordingly, use or enable more virtual processors an entitled number of virtual processors.

A hypervisor 308 may control and arbitrate access by guest operating systems 306 to the underlying computer hardware 302 resources. The hypervisor 308 may include a layer of software 310 that may be disposed between the hardware 302 and the one or more guest operating systems 306. FIG. 3A shows a first type of hypervisor 308, wherein the hypervisor 308 runs directly on the system hardware 302 and one or more partition 304 using virtual resources provided by the hypervisor 308. FIG. 3B shows a second type of hypervisor 308, wherein the hypervisor 308 runs on a host operating system 310 that provides virtualization services, such as I/O device support and memory management.

The one or more physical processors occupied by a partition can be fractions of the processor(s). Typically, however, within each partition, idle time is "trapped" by not using the full hardware thread count. A reason for this may be that a dispatcher, such as an AIX dispatcher, schedules work first on one or more primary simultaneous multithreading (SMT) threads of a processor and additional virtual processors are enabled through virtual processor management before scheduling work on one or more secondary and tertiary SMT threads. A high demand on CPU resources on LPARs may lead to a situation where the shared processor pool is depleted, however, the LPARs themselves showed a high percentage of unused CPU capacity, or idle time.

In order to optimize scheduling behavior within an operating system to maximize system behavior, a mechanism should be present to communicate shared pool utilization with the partitions. On a computer system, such as the POWER computer system sold by International Business Machines Corporation, there may be a communication area between each partition and the hypervisor that may be used to communicate the available physical processor resource available in the shared pool (e.g. lparstat appfield).

While this information is potential useful, there may be several issues with it:

1) It is only available to partitions that are explicitly enabled to read it. This is a security consideration put in place to avoid a potential covert channel of communications between partitions;

2) This field is not indicative of the ratio of available capacity to total capacity, particularly considering that the size of the shared pool may vary over time (e.g. dedicated partition donation of capacity to the shared pool results in a variable shared pool size);

3) In the case where multiple shared pools or group capping is involved, it may be required to communicate either the state of available capacity for the pool or the group AND the state of the overall shared pool capacity; and/or 4) Ideally, the partition would get information based on its instantaneous utilization and include heuristics associated with the scale-up possible in partition utilization associated with core-based hardware multi-threaded.

Some embodiments of the invention may be described a communication area between a hypervisor and guest operating systems that allows the hypervisor to indicate information about the utilization of a system such that the guest operating system may take specific tuning behaviors. The behaviors may involve changing the number of virtual processors in use. Since the communications area could be viewed as a means for guest operating systems to crudely communicate with each other (aka covert channel), the invention extends the abstraction of the communications area to allow random indications of either "no data" or slightly erroneous data to guest operating systems to make the usage of a covert channel unreliable.

As described above, some embodiments of the invention provide a mechanism to provide a simple hint to operating systems running on a hypervisor that would be used to optimize processor folding. In some embodiments of the present invention, the communication between the hypervisor and the operating system may include a three-state flag:

1) Hint fold more aggressively
2) Hint stay at current fold state
3) Hint free to unfold as needed Accordingly, the hypervisor may communicate a flag, also referred to herein as an instruction message, that may abstract the computer system condition to the partition. In some embodiments, the abstract of the system condition may include a current amount of utilization of one or more physical processors, wherein the current amount of utilization may include the ratio of the amount of the one or more physical processors currently in use to the amount of the one or more physical processors potentially available for use.

Some embodiments of the invention may additionally and/or alternatively provide for measurement and/or evaluation of one or more metrics, including but not limited to:

1) The partition physical processor consumed over a short run period (<1 second) (ppc).

2) The partition utilization over a short run period (putil), for example, if the hypervisor can determine the partition utilization. This may include the ratio of CPU busy time/total dispatch time, typically as measured on the hardware.

3) If the partition is group capped, the short run period of physical capacity of the group (gpcav).

4) If the partition is group capped, the number of physical processors in the group (gphys).

5) The physical processors consumed of the overall shared pool over a short run period (sppc) and/or 6) The physical processors available to the shared pool (spz)

The following is a non-limiting example of an embodiment having a three flag state: the flag states {FLAG_MORE_AGGRESSIVE, FLAG_STAY, FLAG_UNFOLD}

Note the thresholds low and high can vary with the number of physical processors assigned to the various pools.

```
if ((putil==LOW) && (sputil==HIGH))
    candidate_flag = FLAG_MORE_AGGRESSIVE;
else if ((putil==HIGH) && (sputil==HIGH))
    candidate_flag = FLAG_STAY;
else if ((putil==HIGH) && (sputil==LOW))
    candidate_flag = FLAG_UNFOLD;
else
    candidate_flag = FLAG_STAY;
if (gcapped)
    {
    if ((gutil==HIGH) && (candidate_flag==FLAG_UNFOLD))
        candidate_flag = FLAG_STAY;
    }
flag becomes candidate_flag
```

As a table, the logic may be presented as:
Not GRCAP PUTIL:LOW SPUTIL:LOW ▭→stay
Not GRCAP PUTIL:LOW SPUTIL:HIGH→More aggressive
Not GRCAP PUTIL:HIGH SPUTIL:LOW→unfold
Not GRCAP PUTIL:HIGH SPUTIL:HIGH→stay
GRCAP GUTIL:LOW PUTIL:LOW SPUTIL:LOW→stay GRCAP GUTIL:LOW PUTIL:LOW SPUTIL:HIGH→More aggressive
GRCAP GUTIL:LOW PUTIL:HIGH SPUTIL:LOW→unfold
GRCAP GUTIL:LOW PUTIL:HIGH SPUTIL:HIGH→stay
GRCAP GUTIL:HIGH PUTIL:LOW SPUTIL:LOW→stay
GRCAP GUTIL:HIGH PUTIL:LOW SPUTIL:HIGH→More aggressive
GRCAP GUTIL:HIGH PUTIL:HIGH SPUTIL:LOW→stay
GRCAP GUTIL:HIGH PUTIL:HIGH SPUTIL:HIGH→stay Additionally and/or alternatively, some embodiments of the present invention may be described as a mechanism to communicate folding aggressiveness requirements to partitions with noise to reduce probability of covert channels. In some embodiments of the present invention, the communication between the hypervisor and the operating system may include a four-state flag:

1) Hint fold more aggressively
2) Hint stay at current fold state
3) Hint free to unfold as needed
4) No data The hypervisor may send the partition "No data" as a state, also referred to herein as an additional message. When the partition receives the additional message, it may behave according to the last valid data or instruction message it received. The additional message may be sent to one or more partitions on the system at the same time. Inclusion of the additional message may reduce the reduce probability of covert channels between partitions. Inclusion of the additional message may additionally and/or alternatively reduce fluctuation in the number of enabled virtual processors at each partition.

Use of the additional message may be random. The hypervisor may generate and/or send the additional message after a random interval of time. The additional message may include one of spurious data and no data.

Additionally and/or alternatively, some embodiments of the present invention may be described as a mechanism to involuntary disable virtual processor(s) in an LPAR, driven from the outside of the LPAR.

Figure 4:
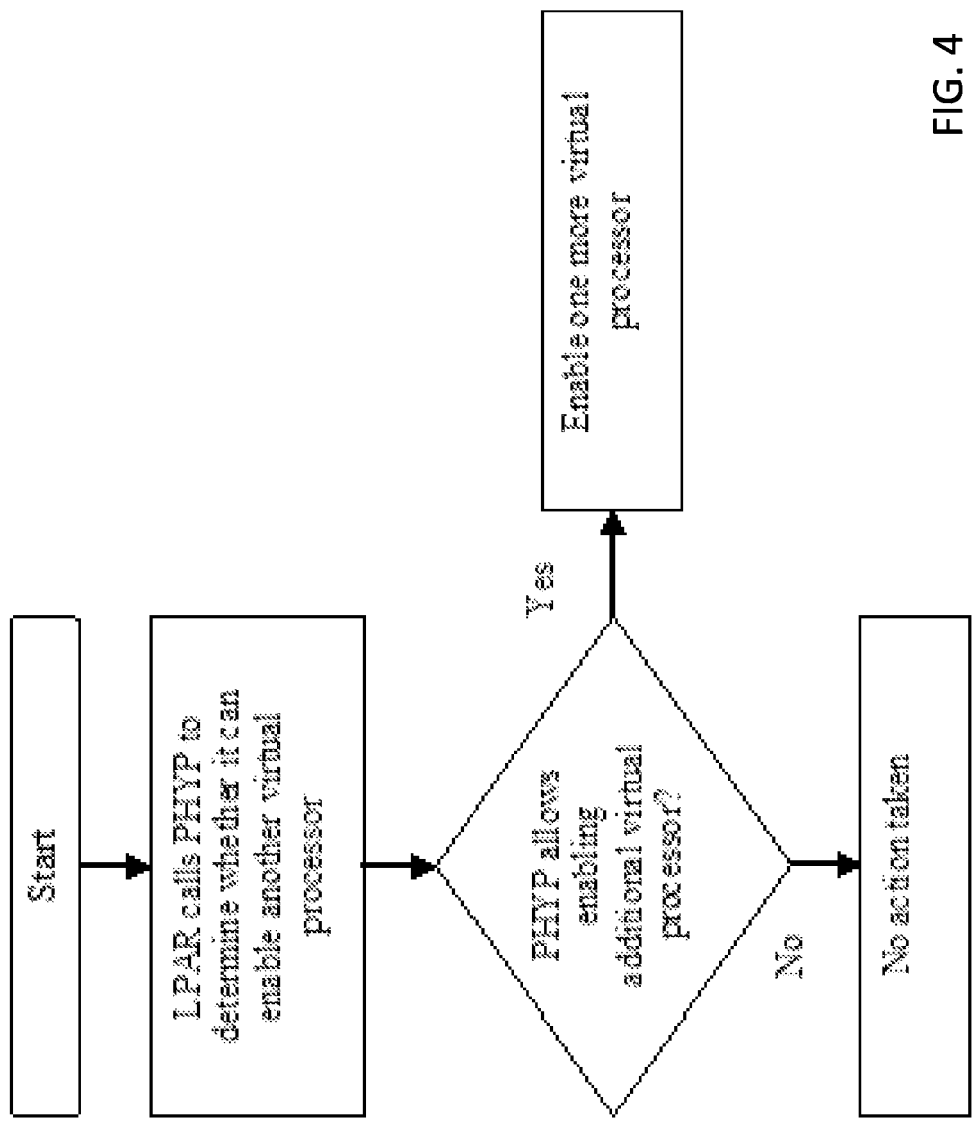
FIG. 4 is an example of a flowchart of managing utilization of one or more physical processors in a shared processor pool.

For example, as shown in FIG. 4, some embodiments of the present invention may be described as a mechanism in which an LPAR that wants to enable additional virtual processors may be required to get permission from the hypervisor when the LPAR is consuming more physical processors than entitled.

A virtual processor management in an operating system, such as AIX operating system, may determine, based on the LPARs current CPU utilization, whether additional virtual processors need to be enabled (unfolded) or enabled CPUs can be disabled (folded).

In addition to the mechanism to determine how many virtual processes are needed by the LPARs, an LPAR that is consuming more physical processors than it has entitled may be required to get permission from a hypervisor to enable additional virtual processors. The LPAR may call or send a request to the hypervisor to determine whether it can enable another virtual processor.

The hypervisor may receive the request to enable a virtual processor. The determination of the hypervisor whether to grant the request to enable additional processors may be based on the number of available physical processors in the shared processor pool. If the hypervisor allows enabling additional virtual processor, then the LPAR may enable one more virtual processor. If the hypervisor does not allow enabling of additional virtual processor, then no action may be taken.

Figure 5:
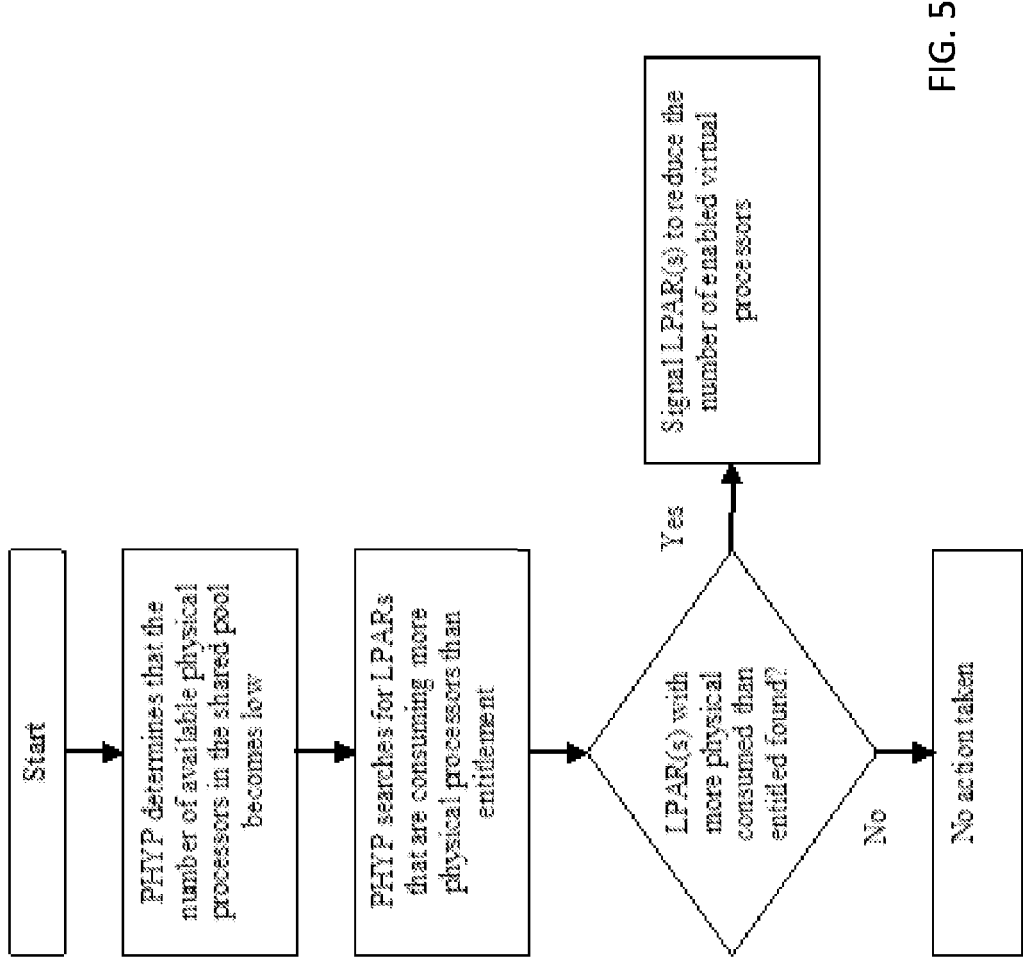
FIG. 5 is an example of a flowchart of managing utilization of one or more physical processors in a shared processor pool.

Additionally and/or alternatively, and as shown in FIG. 5, some embodiments of the invention may be described as a mechanism that voluntary disables virtual processors of a single or multiple uncapped shared processor LPARs, in the case that the shared processor pool is running low on available physical processors and the LPAR(s) is consuming more capacity than entitled. Additionally and/or alternatively, some embodiments of the present invention may be described as a mechanism in which a hypervisor may monitor the number of available processors in a shared processor pool and may signal those LPARs that consume more physical processors than entitled, to reduce their number of virtual processors.

If the hypervisor determines that the number of available physical processors in the shared processor pool becomes low, the hypervisor may search for LPARs that are using more physical processors than the LPARs have entitled. If the hypervisor finds one or more LPARs that are using more physical processors than the LPARs have entitled, the hypervisor may signal these LPARs to reduce the number of enabled virtual processors. This signaling may be accomplished through an I/O interrupt.

No action may be taken if none of the LPARs are consuming more physical processors than entitlement.

The hypervisor can use tunable minimum and maximum number of available physical processors to detect a low condition. If the available capacity of available physical processors in the shared processor pool is below the maximum tunable, the hypervisor may not grant requests for adding virtual processors. If the available capacity of available physical processors in the shared processor pool is below the minimum tunable, the hypervisor may search for LPARs that consume more physical processors than entitled and signal them to reduce their number of virtual processors.

Figure 6:
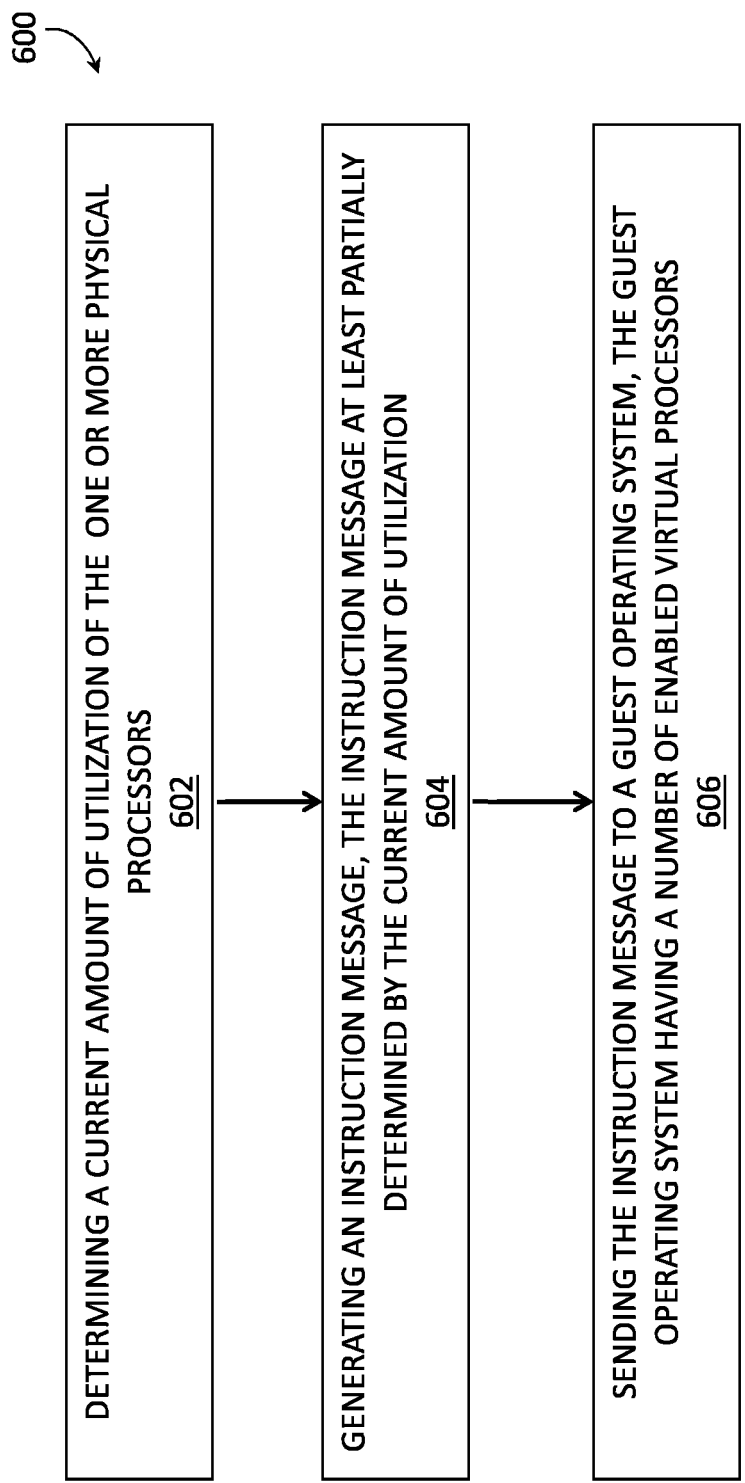
FIG. 6 is an example of a method of managing utilization of one or more physical processors in a shared processor pool.

Referring now to FIG. 6, an example method 600 of a managing utilization of one or more physical processors in a shared processor pool is shown. While FIG. 6 shows exemplary steps of a method according to one embodiment, other embodiments may omit, add to, and/or modify any of the steps shown in that figure. In step 602, a current amount of utilization of the one or more physical processors may be determined. In step 604, an instruction message may be generated. The instruction message may be at least partially determined by the current amount of utilization. In step 406, the instruction message may be sent to a guest operating system, the guest operating system having a number of enabled virtual processors.

Method 600 may include other steps. For example, method 600 may include generating an additional message, the additional message generated after a random interval of time and including one of spurious data and no data, and sending the additional message to the guest operating system. Method 600 may further include receiving the instruction message and changing the number of enabled virtual processors at the guest operating system in response to the instruction message. Additionally and/or alternatively, method 600 may include receiving an additional message and repeating the change to the number of enabled virtual processors at the guest operating system.

Additionally and/or alternatively, method 600 may include determining the number of enabled virtual processors of the guest operating system exceeds an entitled number of enabled virtual processors and determining the current amount of utilization is below a preset minimum amount, wherein the instruction message may include an indication to reduce the number of enabled virtual processors.

Additionally and/or alternatively, method 600 may include receiving a request from the guest operating system to enable an additional virtual processor and determining the current amount of utilization is below a preset maximum amount, wherein the instruction message may include an indication to maintain the number of enabled virtual processors.

Additionally and/or alternatively, method 600 may include generating an additional message, the additional message generated after a random interval and not determined by the current amount of utilization of the one or more physical processors, and sending the additional message to the guest operating system. Additionally and/or alternatively, method 600 may include determining that the guest operating system has not changed the number of enabled virtual processors in response to the instruction message and reducing an entitled number of enabled virtual processors allocated to the guest operating system.

Additionally and/or alternatively, the instruction message may include an indication to the guest operating system to change the number of enabled virtual processors. Additionally and/or alternatively, the instruction message may include an indication to the guest operating system to maintain the number of enabled virtual processors. Additionally and/or alternatively, the current amount of utilization includes the ratio of the amount of the one or more physical processors currently in use to the amount of the one or more physical processors potentially available for use.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the various embodiments of the present invention has been presented for purposes of illustration, but is not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of managing utilization of one or more physical processors in a shared processor pool, the method comprising:
    determining a current amount of utilization of the one or more physical processors of a shared processor pool;
    generating an instruction message by a hypervisor that is managing one or more guest operating systems, the instruction message at least partially determined by the current amount of utilization, wherein the instruction message comprises a flag representing a virtual processor folding state for a guest operating system of the one or more guest operating systems, the virtual processor folding state representing a virtual processor activation strategy for the guest operating system;
    sending the instruction message to the guest operating system, the guest operating system having a number of enabled virtual processors, wherein a value of the virtual processor folding state represented by the flag is determined based on an amount of virtual processor utilization for the guest operating system and an amount of physical processor utilization for the shared processor pool; and
    setting the number of enabled virtual processors of the guest operating system based on the instruction message.

2. The method of claim 1, wherein the instruction message includes an indication to the guest operating system to change the number of enabled virtual processors.

3. The method of claim 1, wherein the instruction message includes an indication to the guest operating system to maintain the number of enabled virtual processors.

4. The method of claim 1, further comprising:
    generating an additional message comprising a flag indicating that the guest operating system apply a virtual processor folding state according to a previously received instruction message, the additional message generated after a random interval of time and including one of spurious data and no data; and
    sending the additional message to the guest operating system.

5. The method of claim 1, wherein the current amount of utilization includes the ratio of the amount of the one or more physical processors currently in use to the amount of the one or more physical processors potentially available for use.

6. The method of claim 1, further comprising:
    receiving the instruction message; and changing the number of enabled virtual processors at the guest operating system in response to the instruction message.

7. The method of claim 6, further comprising:
    receiving an additional message comprising a flag indicating that the guest operating system apply a virtual processor folding state according to a previously received instruction message; and
    repeating the change to the number of enabled virtual processors at the guest operating system.

8. The method of claim 1,
wherein the instruction message includes an indication to reduce the number of enabled virtual processors, in response to determining the number of enabled virtual processors of the guest operating system exceeds an entitled number of enabled virtual processors and determining the current amount of utilization is below a preset minimum amount.

9. The method of claim 1,
wherein the instruction message includes an indication to maintain the number of enabled virtual processors in response to receiving a request from the guest operating system to enable an additional virtual processor and determining the current amount of utilization is below a preset maximum amount.

10. A computer program product for managing utilization of one or more physical processors in a shared processor pool, the computer program product comprising:
at least one computer readable storage medium having computer readable program code embodied therewith, the computer readable storage medium not comprising a propagating storage medium, the computer readable program code, when read by a processor, configured to:
determine a current amount of utilization of the one or more physical processors of a shared processor pool;
generate an instruction message by a hypervisor that is managing one or more guest operating systems, the instruction message at least partially determined by the current amount of utilization, wherein the instruction message comprises a flag representing a virtual processor folding state for a guest operating system of the one or more guest operating systems, the virtual processor folding state representing a virtual processor activation strategy for the guest operating system;
send the instruction message to the guest operating system, the guest operating system having a number of enabled virtual processors, wherein a value of the virtual processor folding state represented by the flag is determined based on an amount of virtual processor utilization for the guest operating system and an amount of physical processor utilization for the shared processor pool; and
set the number of enabled virtual processors of the guest operating system based on the instruction message.

11. The computer program product of claim 10, wherein the instruction message includes an indication to change the number of enabled virtual processors.

12. The computer program product of claim 11, wherein the computer readable program code, when read by a processor, is further configured to:
generate an additional message comprising a flag indicating that the guest operating system apply a virtual processor folding state according to a previously received instruction message, the additional message generated after a random interval and not determined by the current amount of utilization of the one or more physical processors; and
send the additional message to the guest operating system.

13. The computer program product of claim 11, wherein the computer readable program code, when read by a processor, is further configured to:
determine that the guest operating system has not changed the number of enabled virtual processors in response to the instruction message; and
reduce an entitled number of enabled virtual processors allocated to the guest operating system.

14. The computer program product of claim 10,
wherein the instruction message includes an indication to reduce the number of enabled virtual processors, in response to determining the number of enabled virtual processors of the guest operating system exceeds an entitled number of enabled virtual processors and determining the current amount of utilization is below a preset minimum amount.

15. The computer program product of claim 10,
wherein the instruction message includes an indication to maintain the number of enabled virtual processors in response to receiving a request from the guest operating system to enable an additional virtual processor and determining the current amount of utilization is below a preset maximum amount.

16. A computer, comprising:
a processor;
a memory; and
a program for managing utilization of one or more physical processors in a shared processor pool, the program including a plurality of instructions stored in the memory that are executed by the processor to:
determine a current amount of utilization of the one or more physical processors of a shared processor pool;
generate an instruction message by a hypervisor that is managing one or more guest operating systems, the instruction message at least partially determined by the current amount of utilization, wherein the instruction message comprises a flag representing a virtual processor folding state for a guest operating system of the one or more guest operating systems, the virtual processor folding state representing a virtual processor activation strategy for the guest operating system;
send the instruction message to the guest operating system, the guest operating system having a number of enabled virtual processors, wherein a value of the virtual processor folding state represented by the flag is determined based on an amount of virtual processor utilization for the guest operating system and an amount of physical processor utilization for the shared processor pool; and
set the number of enabled virtual processors of the guest operating system based on the instruction message.

17. The computer of claim 16, wherein the instruction message includes an indication to change the number of enabled virtual processors.

18. The computer of claim 16, wherein the plurality of instructions further includes instructions that are executed by the processor to:
generate an additional message, the additional message generated after a random interval and including one of spurious data and no data; and
send the additional message to the guest operating system.

19. The computer of claim 16, wherein the plurality of instructions further includes instructions that are executed by the processor to:
receive the instruction message; and
change the number of enabled virtual processors at the guest operating system in response to the instruction message.

20. The computer of claim 16,
wherein the instruction message includes an indication to maintain the number of enabled virtual processors in response to receiving a request from the guest operating system to enable a virtual processor and determining the current amount of utilization of the one or more physical processors is below a preset maximum amount.

* * * * *